United States Patent [19]

Adamczek

[11] Patent Number: 4,946,137
[45] Date of Patent: Aug. 7, 1990

[54] WIRE FEEDING TOOL

[76] Inventor: Thomas Adamczek, 13N654 Gunpowder La., Elgin, Ill. 60123

[21] Appl. No.: 410,483

[22] Filed: Sep. 21, 1989

[51] Int. Cl.⁵ .............................................. E21C 29/16
[52] U.S. Cl. ............................ 254/134.3 FT; 254/415
[58] Field of Search .............. 254/134.3 FT, 134.3 R, 254/134.3 PA, 390, 415, 413; 220/3.2, 3.5; 226/179, 180, 194; 248/63, 231.1, 291

[56] References Cited

U.S. PATENT DOCUMENTS

| | | | |
|---|---|---|---|
| 1,995,340 | 3/1935 | Buxton | 254/134.3 R |
| 3,218,033 | 11/1965 | Miller | 254/134.3 FT |
| 3,944,184 | 3/1976 | Fisch | 254/134.3 R |
| 4,151,903 | 5/1979 | Martino | 254/134.3 R |
| 4,228,990 | 10/1980 | Horvath | 254/134.3 FT |
| 4,358,089 | 11/1982 | Metcalf | 254/134.3 FT |
| 4,541,615 | 9/1985 | King | 254/415 |

FOREIGN PATENT DOCUMENTS

| | | | |
|---|---|---|---|
| 1119111 | 6/1983 | U.S.S.R. | 254/134.3 R |
| 918346 | 2/1963 | United Kingdom | 254/134.3 R |

*Primary Examiner*—Robert C. Watson
*Attorney, Agent, or Firm*—Edmond T. Patnaude

[57] ABSTRACT

An electric wire or cable feeding tool is provided with mounting brackets for removably attaching the tool to opposite side walls of a conventional electric junction box. An axle extends between the two mounting brackets, and an elongate guide roller having enlarged respective ends is journaled thereon.

2 Claims, 1 Drawing Sheet

U.S. Patent  Aug. 7, 1990  4,946,137
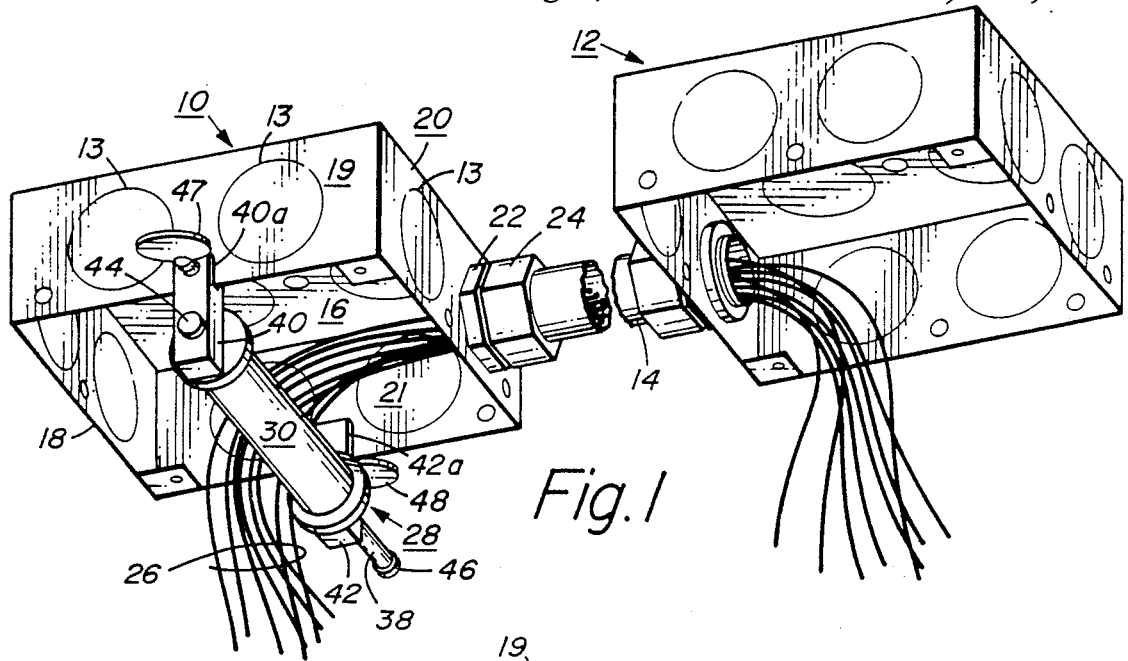
Fig. 1
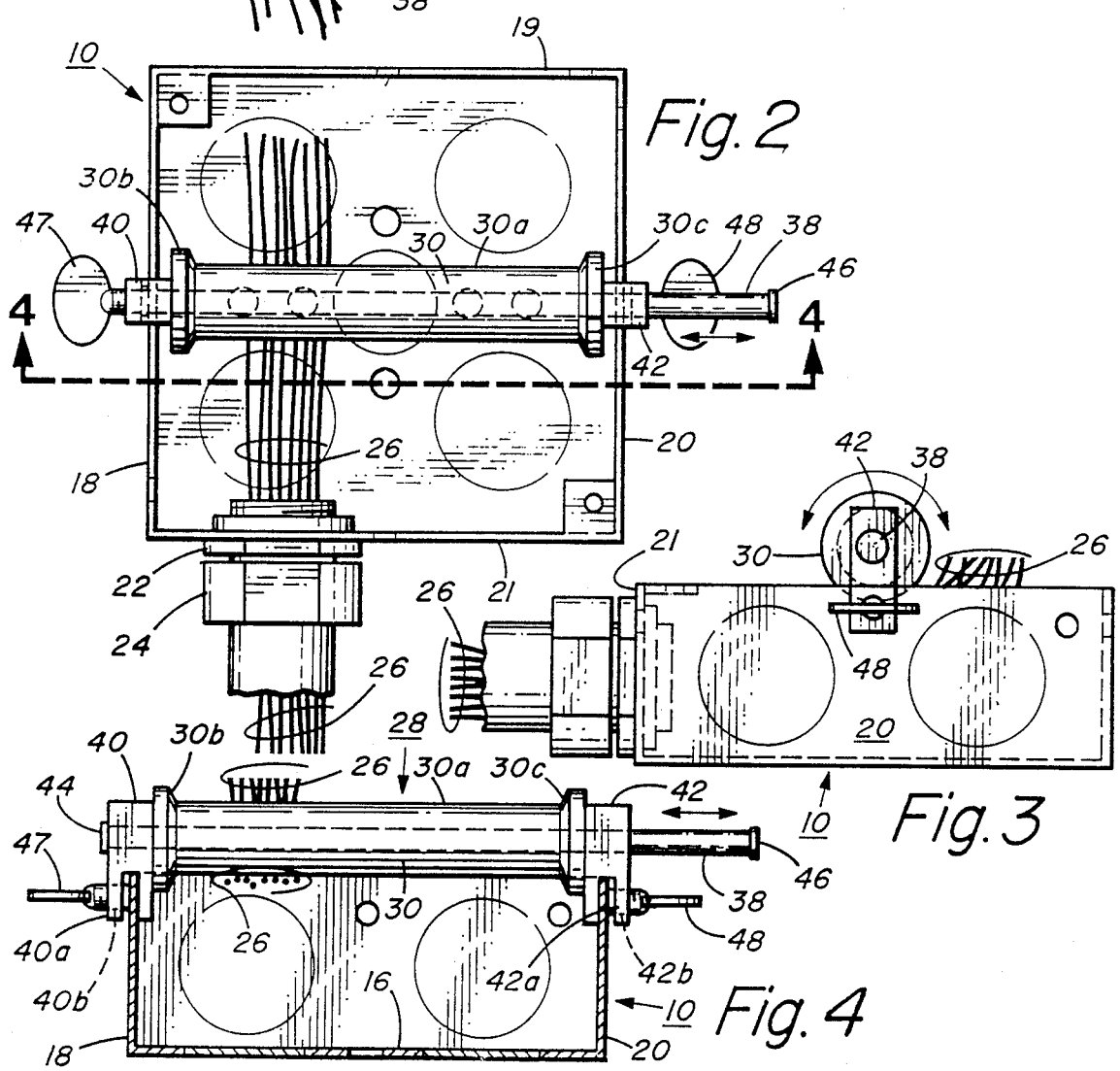
Fig. 2
Fig. 3
Fig. 4

WIRE FEEDING TOOL

The present invention relates in general to tools for facilitating the feeding of electric wire and cable into conduits attached to electric junction boxes, and it relates more particularly to a new and improved tool which may be carried in the pocket of an electrician for quick attachment to an electric junction box when wire or cable is to be pulled therethrough. The invention further relates to a new and improved method of feeding wire and cable into conduit attached to an electric junction box.

BACKGROUND OF THE INVENTION

When wiring building structures it is the common practice to mount rigid conduit and attached junction boxes to the walls and ceilings and to subsequently feed the wire or cable through the boxes and conduit. Where the runs between boxes are long and tortuous and the wires are relatively stiff and numerous, the operation of pulling the wires from one box to another becomes difficult. In a normal situation individual wires from twelve or more rolls must be simultaneously fed into one box and associated conduit by one person while another person at the other end of the conduit pulls the wire through the conduit. The feeding operation is further complicated when the junction box is mounted to the ceiling at an elevated position necessitating the use of a ladder.

Wire guides in the nature of curved horns have been suggested for attachment to one end of a conduit where it is mounted to a junction box so that the wires may be fed at an angle of ninety degrees relative to the conduit. Such a device is described in U.S. Pat. No. 2,515,724. In U.S. Pat. No. 4,132,665, a rigid funnel for use in feeding wires through a junction box and associated conduit is disclosed. These prior art devices have not found acceptance in the related trades, being as they are relatively large and bulky and not easy to use.

SUMMARY OF THE INVENTION

Briefly, in accordance with the present invention there is provided a relatively small, portable roller unit which includes a pair of adjustable mounts for attachment over the distal edges of oppositely disposed walls of a junction box. An elongate roller having a length approximating the distance between opposite walls of a conventional square junction box is journaled on an axle extending between the two adjustable mounts in proximity to the distal edges to which the unit is mounted. In use the unit is oriented so that the axis of rotation of the roller is perpendicular to the axis of the conduit where it is mounted to the junction boxes. Inasmuch as there are different sizes of junction boxes, in a preferred embodiment of the invention the mounts are axially adjustable on the roller mounting axle so that the tool is usable with the different size junction boxes.

When using the tool of the present invention, the tool is mounted to the junction box into which the wires are to be fed and the ends of the wires after attachment thereof to a flexible pull tape are passed over the roller between the end of the box opposite the conduit, between the roller and the base of the box and into the conduit. Even when the junction box is mounted an elevated position the wires can be fed into the junction box and the associated conduit in a facile manner without the need for a ladder or the like.

GENERAL DESCRIPTION OF THE DRAWINGS

Further objects and advantages and a better understanding of the present invention will be had by reference to the following detailed description taken in connection with the accompanying drawings wherein:

FIG. 1 is a perspective view, partly broken away, showing the wire feed tool of the present invention in use;

FIG. 2 is a plan view of a junction box to which the wire feed tool of the present invention is attached;

FIG. 3 is an end view of the junction box and wire feed tool assembly of FIG. 2; and FIG. 4 is a cross-sectional view taken along the line 4—4 of FIG. 2.

DETAILED DESCRIPTION OF A PREFERRED EMBODIMENT OF THE INVENTION

Referring to FIG. 1, there is shown a first electric junction box 10 and a second electric junction box 12 between which a rigid tube or conduit 14 is connected. The junction boxes 10 and 12 are conventional and may be identical in construction. It will be seen that the junction box 10 includes a base section 16 and four upstanding side walls 18, 19, 20 and 21. The base section 16 is square and the side walls 18, 19, 20 and 21 are rectangular. Circular knockouts 13 are provided in the base section 16 as well as in the side walls and when removed expose circular holes through which wires may be fed to an associated conduit. It will be seen that the conduit 14 is mounted to the box in the conventional manner including a pair of nuts 22 and 24.

The junction boxes 10 and 12 are shown in FIG. 1 in a typical position, i.e., mounted in an inverted position with the base section 16 at the top and with the side walls 18, 19, 20 and 21 depending downwardly therefrom. When a building is wired, a plurality of wire strands or cables identified collectively at 26 are fed through the conduit 14 from one box to another. Ordinarily a flexible pull tape is first inserted through the conduit and the ends of the wires 26 are taped or otherwise attached thereto at the end thereof in the vicinity of the box 10 and the tape is then pulled through the conduit to the box 12 to pull the wires 26 through the conduit 14 to the box 12.

In order to facilitate the feeding of the wires 26 through the junction box 10 into the conduit 14, there is provided in accordance with the present invention a small, portable feed tool 28 which is adapted to be mounted to opposite ones of the walls 18, 19, 20 and 21 of the junction box 10 over the opening in the box opposite the base section 16. As shown, the wire feed tool 28 includes an elongate roller 30 over which the wires 26 extend to guide the wires into the conduit 14.

Considered in greater detail and with further reference to FIGS. 2, 3 and 4, the wire feed tool 28 may be seen to include an axle or shaft 38 on which the roller 30 is journaled for free rotation. A pair of mounting brackets 40 and 42 are provided with mutually aligned holes which receive the axle 38 on opposite ends of the roller 30. A pair of end caps 44 and 46 are attached to the respective ends of the axle 38 to prevent the unit from being spuriously disassembled. It may be seen that the axle 38 is substantially longer than the corresponding dimension of the junction box thereby to permit use of the tool with different sizes of junction boxes.

The roller 30 has an elongate central section 30a which is longer than the distance between the outside edges of adjacent ones of the knock outs 13, and two tapered end sections 30b and 30c of larger diameter aid in preventing the wires from slipping off the end of the roller and becoming jammed between the end of the roller and the adjacent wall of the junction box.

The brackets 40 and 42 are respectively provided with bifurcated ends defining respective slots 40a and 42a which are adapted to receive opposite ones of the side walls of the junction box as illustrated in the drawings. The outer tines of the brackets 40 and 42 are provided with threaded holes 40b and 42b which threadedly receive a pair of thumb screws 47 and 48 which are used to lock the tool 28 onto the box after the brackets 40 and 42 have been positioned with the walls of the box extending fully into the slots 40a and 42a.

In accordance with the present invention wire or cable may be fed into a conduit by mounting the brackets 40 and 42 to opposite walls of a junction box to orient the axle 38 perpendicularly to the wall to which the conduit is mounted. The separate wires or cables are passed over the roller 30 between the base 16 and the roller after attachment to a pull-tape or the like which was previously inserted through the conduit. Thereafter, the pull-tape can be pulled through the conduit to pull the wires or cables over the roller and through the conduit.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. A wire feeding tool for attachment to an electric junction box having a first pair of upstanding, mutually parallel side walls and a second pair of upstanding mutually parallel side walls which are perpendicular to said first side walls, a tubular conduit being affixed to one of said first walls over an aperture therein, comprising in combination first and second mounting brackets each having a slot for receiving a distal edge portion of a respective one of said second walls, said slots having a thickness dimension greater than the thickness of said second walls, an elongate axle mounted to said mounting brackets with the longitudinal axis of said axle lying perpendicular to said second walls when said second side walls are received in said slots of said first and second mounting brackets, whereby said axle is parallel to said first walls, an elongate roller mounted on said axle for free rotation and extending perpendicular to said second side walls when said second side walls are received in said slots in said first and second mounting brackets, said roller having a length less than the distance between said second side walls, the end portions of said roller being disposed in proximity to the inner sides of said second side walls when said second side walls are received in said slots, and means for locking said brackets to said second side walls.

2. A wire feeding tool according to claim 1 wherein said means for locking said brackets to said second side walls comprises first and second thumb screws respectively mounted to said first and second mounting brackets.

* * * * *